Dec. 3, 1940.  K. A. SCHARBAU  2,223,859
METER CONNECTING DEVICE
Filed Aug. 26, 1938  2 Sheets-Sheet 1
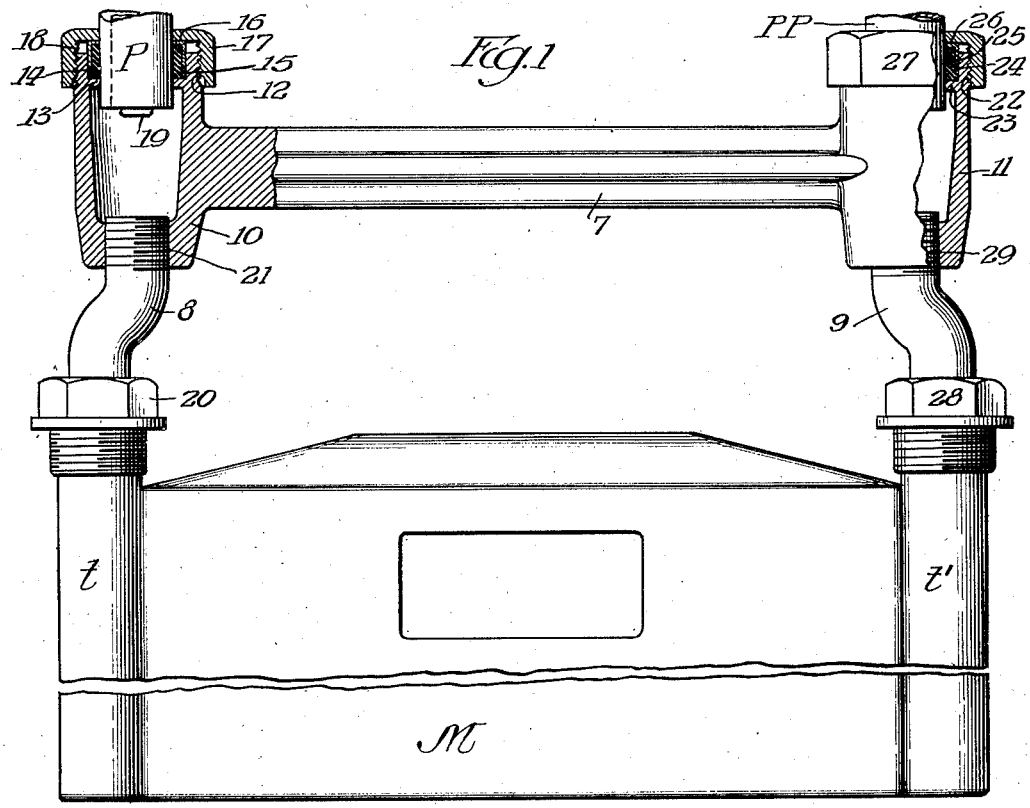
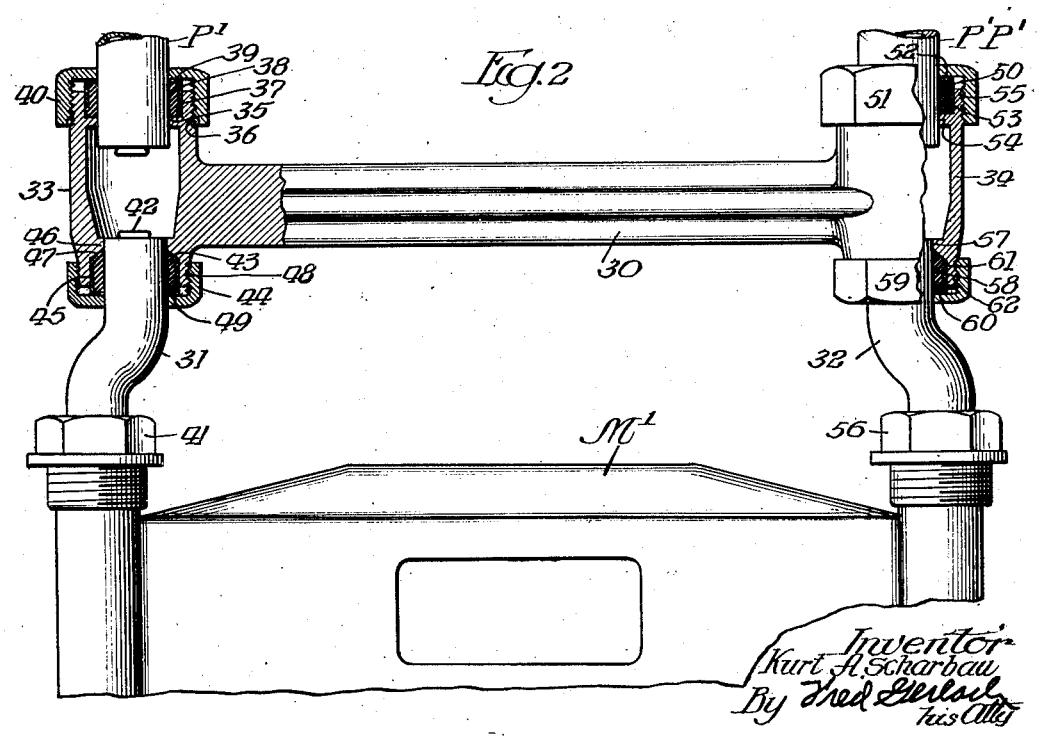
Inventor
Kurt A. Scharbau
By Thed Gerlach
his Atty Dec. 3, 1940. K. A. SCHARBAU 2,223,859
METER CONNECTING DEVICE
Filed Aug. 26, 1938 2 Sheets-Sheet 2
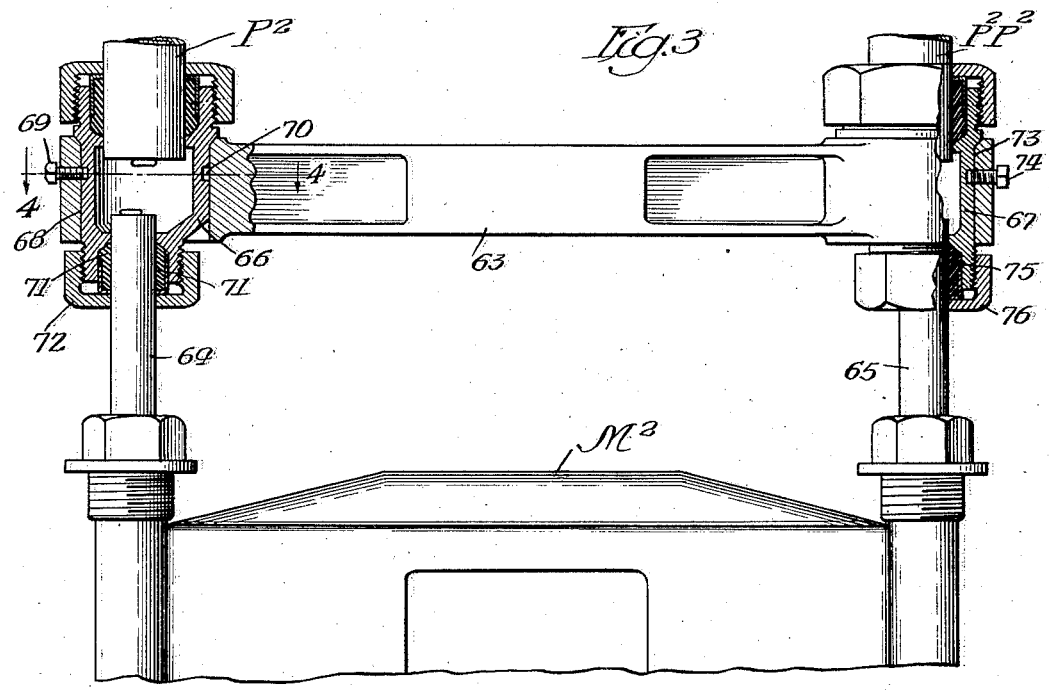
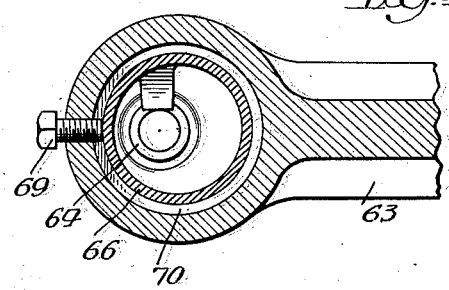
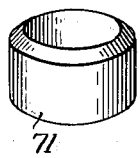
Inventor
Kurt A. Scharbau
By Fred Gerlach
his Atty.

Patented Dec. 3, 1940

2,223,859

UNITED STATES PATENT OFFICE 2,223,859

METER CONNECTING DEVICE

Kurt A. Scharbau, Rockford, Ill., assignor, by mesne assignments, to Eclipse Fuel Engineering Co., Rockford, Ill., a corporation of Illinois Application August 26, 1938, Serial No. 226,856

6 Claims. (Cl. 285—3)

The present invention relates generally to devices for use in connecting gas meters to gas service and supply pipes. More particularly the invention relates to that type of meter connecting device which comprises a horizontally extending crossbar and means at the ends of the crossbar for connecting the inlet and outlet tubes of the meter to the gas service and supply pipes respectively.

One object of the invention is to provide a meter connecting device of this type which is an improvement upon and has certain advantages over previously designed devices of the same general character.

Another object of the invention is to provide a meter connecting device in which the means for connecting the meter tubes to the gas pipes are of novel design and not only facilitate assembly and installation of the device, but also dispense with screw thread connections and effectively and efficiently absorb vibration and eliminate any strain on the meter tubes.

Other objects of the invention will be apparent from a consideration of the following detailed description.

The invention consists in the several novel features which are hereinafter set forth and are more particularly defined by claims at the conclusion hereof.

In the drawings which accompany and form a component part of this specification or disclosure and in which like numerals of reference denote corresponding parts throughout the several views:

Figure 1 is a view partly in side elevation and partly in section of a meter connecting device embodying one form of the invention;

Figure 2 is a like view of a meter connecting device embodying a second or modified form of the invention;

Figure 3 is a view partly in side elevation and partly in section of a meter connecting device embodying a third form of the invention;

Figure 4 is a horizontal sectional view on the line 4—4 of Figure 3;

Figure 5 is a perspective view of one of the gaskets which serve to form leak-proof joints for the meter connecting device of Figure 3; and Figure 6 is a perspective view of one of the gasket retainers.

The device which is shown in Figure 1 of the drawings constitutes one embodiment of the invention and is adapted for use in connecting a gas meter M to a gas service pipe P and a supply pipe PP. The meter M is of standard or conventional construction and embodies a vertically extending inlet tube $t$ at one side of the meter casing and a vertically extending outlet tube $t'$ at the other side of the casing. The tubes project upwardly beyond the top of the meter casing and are provided at their upper ends with external screw threads. The meter connecting device of Figure 1 comprises a horizontally extending crossbar 7 and a pair of depending offset coupling nipples 8 and 9. The crossbar is in the form of a one-piece casting and embodies at one end thereof an integral vertically extending tubular member 10 and at its other end an integral vertically extending tubular member 11. The upper end of the tubular member 10 projects above the crossbar and is shaped to receive the discharge end of the service pipe P. It is provided with an external screw thread 12 and embodies beneath its top-face an integral inwardly extending annular flange 13. The latter defines with the portion of the inner periphery of the tubular member 10 that is disposed above it an inwardly facing annular recess 14. An annular or ring shaped gasket 15 of any suitable compressible material such as molded rubber or rubber composition is disposed in and projects above this recess as shown in Figure 1, and surrounds and engages the portion of the discharge end of the gas service pipe that fits within the upper end of the tubular member 10. This gasket has a smooth inner periphery and receives slidably the discharge end of the service pipe P. Such end of the service pipe as well as the inlet end of the supply pipe has a smooth outer or external periphery, as shown in Figure 1 of the drawings. A ring-shaped metallic retainer 16 surrounds the upper end of the gasket 15 and is adapted in connection with a ring nut 17 to compress the gasket around the supply pipe so as to form a permanent leak-proof joint between the service pipe and the upper end of the tubular member 10. The nut 17 surrounds the pipe P and embodies an internal screw thread 18 in engagement with the external screw thread 12. The retainer 16 fits slidably in the recess and embodies an inwardly extending top flange which overlies the top face of the gasket and abuts against the central portion of the nut. When the nut 17 is tightened the retainer is forced downwardly within the annular recess 14 and operates to compress the gasket so that it fills the recess and engages in a leak-proof manner the discharge end of the gas service pipe P. The joint which is formed by the gasket eliminates the necessity of a screw thread connection between the gas pipe and the upper end of the tubular member 10 and, in addition to being leak-proof, is slightly flexible. In order to limit inward movement of the pipe P with respect to the upper end of the tubular member 10 a stop 19 is provided. This stop is formed integrally with the member 10 and is disposed a slight distance beneath the annular flange 13. The offset coupling nipple 8 serves to connect the lower end of the tubular member 10 to the inlet tube $t$ of the gas meter M. It extends vertically as shown in Figure 1 and is provided at its lower end with a coupling ring 20 for engagement with the external screw thread at the upper end of the tube $t$. The upper end of the nipple 8 fits within and is connected by a screw thread connection 21 to the lower end of the member 10. The interior of the member 10 constitutes a passage whereby communication is established between the discharge end of the service pipe P and the nipple 8. The lower end of the member 10 projects beneath the crossbar and is of smaller diameter than the upper end.

The tubular member 11 is the same in design and construction as the tubular member 10. The upper end of the member 11 projects above the crossbar and is shaped to receive the inlet end of the gas supply pipe PP. It embodies an external screw thread 22 and has an integral inwardly annular flange 23. The latter serves as a centering medium for the service pipe PP and is horizontally aligned with the annular flange 13 in the upper end of the tubular member 10. It is disposed a short distance beneath the top face of the upper member 11 and defines with the superjacent inner peripheral portion of the said member 11 an annular inwardly facing recess 24 for an annular gasket 25. The latter is similar in size and shape to and is formed of the same material as the gasket 15 and is adapted to be urged downwardly into compressed and joint forming relation with the inlet end of the supply pipe PP by way of a metallic ring shaped retainer 26 and a ring nut 27. The nut embodies an internal screw thread for the external screw thread 22 and is adapted when tightened to force the retainer 26 downwards in such manner that the latter serves to compress the gasket 25 within the annular recess 24 and form a permanent leak-proof joint between the upper end of the tubular member 11 and the inlet end of the supply pipe PP. The retainer 26 is of the same design as the retainer 16 and fits slidably within the upper end of the recess 24. The lower end of the tubular member 11 projects beneath the crossbar 7 and is connected to the outlet tube $t'$ of the gas meter M by way of the offset coupling nipple 9. The latter extends vertically and embodies a coupling ring 28 at its lower end whereby it is connected to the externally threaded upper end of the outlet tube. The upper end of the nipple 9 extends into and is connected by a screw thread connection 29 to the lower end of the tubular member 11.

When assembling or installing the meter connecting device of Figure 1 the coupling nipples 8 and 9 are first screwed into the lower ends of the tubular members at the ends of the crossbar. Thereafter the coupling rings at the lower ends of the nipples are screwed onto the upper threaded ends of the meter tubes. After the last operation or step the crossbar, together with the gas meter M, is shifted upwardly in order to bring the discharge end of the gas service pipe P and the inlet end of the supply pipe PP into the upper ends of the tubular members 10 and 11, respectively. After proper positioning of the pipes with respect to the tubular members the ring nuts 17 and 27 are tightened so as to compress the gaskets 15 and 25 and form permanent leak-proof connections between the pipes and the upper ends of the tubular members. After tightening of the ring nuts the installation of the device is completed. By reason of the fact that the nipples 8 and 9 are of the offset variety, the coupling rings at the lower ends thereof may be brought into registry with the upper ends of the meter tubes merely by rotating one or both of the nipples. By employing the specific form or type of leak-proof joints heretofore described, installation of the device is extremely simple and screw threads on the discharge end of the service pipe and the inlet end of the supply pipe PP are eliminated. By reason of the fact that the joints are slightly flexible any vibration of the pipes is absorbed and hence does not disturb or affect in any way the gas meter M. Another object or feature of employing leak-proof joints of the compressible gasket type or variety is that the crossbar may be positioned truly horizontally even though the bottom faces of the gas service and supply pipes are not in the same horizontal plane. A still further object resides in the fact that the gas pipes are free to move one relatively to the other in response to temperature variations without imparting any undue strain to the crossbar or in any way affecting the meter M. Whereas but one mode of assembly or installation of the device of Figure 1 has been described in detail it is to be understood that the device may be installed by first connecting the tubular members to the gas pipes and then connecting the meter M to the offset coupling nipples 8 and 9 by way of the coupling rings at the lower ends of the nipples.

The device which is shown and illustrated in Figure 2 of the drawings constitutes another embodiment of the invention. It is shown in connection with a conventional gas meter M', a gas service pipe P' and a supply pipe P'P' and comprises a crossbar 30 and a pair of offset coupling nipples 31 and 32. The crossbar embodies a pair of vertically extending tubular members 33 and 34 at its ends and, like the crossbar of the meter connecting device of Figure 1, is in the form of a one-piece casting. The tubular member 33 projects above and below the crossbar and is shaped at its upper end to receive the discharge end of the service pipe P'. Said upper end of the tubular member 33 is similar in design to the upper end of the tubular member 10 of the meter connecting device of Figure 1 and embodies an inwardly extending annular flange 35 and an external screw thread 36. The flange is disposed beneath the top face of the upper end of the tubular member 33 and defines with the superjacent inner peripheral portion an annular inwardly facing recess 37 for a compressible gasket 38. The latter surrounds and engages slidably and directly the discharge end of the gas service pipe P' and is held in compressed or sealed relation with said pipe and the recess by way of a ring shaped metallic retainer 39 and a ring nut 40. The nut is adapted when tightened to force the retainer downwardly to effect compression of the gasket in the same manner as the nut 17 at the upper end of the tubular member 10 of the crossbar 7. The coupling nipple 31 depends from the lower end of the tubular member 33 and is provided at its lower end with a coupling ring 41 whereby it is connected to the externally threaded upper end of of the inlet tube of the meter M'. The upper end of the coupling nipple, instead of being externally threaded, is smooth as shown in Figure 2 and fits within the lower projecting end of the tubular member 33. It abuts against a lug-formed stop 42 in the central portion of the member 33 and is secured in place by means of a compressible gasket 43 and a ring nut 44. The gasket 43 is formed of molded rubber or rubber composition and fits within an inwardly facing annular recess 45 in the lower end of the tubular member 33. It has a smooth or cylindrical inner periphery and receives slidably the upper end of the nipple 31. The recess 45 is defined at its upper end by way of an annular inwardly extending flange 46 which is formed integrally with the lower end of the tubular member 33 and is shaped to form a tapered seat 47 for the upper end of the gasket. The nut 44 is internally threaded and is connected to an external screw thread 48 on the lower end of the member 33. A metallic ring shaped retainer 49 surrounds the lower end of the gasket 43 and is adapted in response to tightening of the nut 44 to compress the gasket so that it fills the upper end of the recess 45 and forms a permanent flexible leak-proof joint between the upper end of the nipple 31 and the lower end of the tubular member 33. The interior of the member 33 constitutes a passageway whereby communication is established between the discharge end of the gas service pipe P' and the coupling nipple 31.

The tubular member 34 at the other end of the cross-bar 30 and said coupling nipple 32 are similar in design to the tubular member 33 and the nipple 31, respectively. They constitute means for connecting the outlet tube of the meter to the inlet end of the supply pipe P'P'. The member 34 is formed integrally with the crossbar and projects above and below the latter. The upper end of the member is shaped to receive the inlet end of the supply pipe P'P' and is connected to the latter by means of a compressible annular gasket 50 and a ring nut 51. The gasket 50 is of the same design and shape as the compressible gasket 38 in the recess 37 and is provided at the upper end thereof with a ring shaped metallic retainer 52. It surrounds and engages directly the inlet end of the supply pipe P'P' and fits within an inwardly facing annular recess 53 in the upper end of the tubular member 34. The lower end of the recess is defined by an annular inwardly extending flange 54 which is formed integrally with the member 34 and serves as a centering medium for the pipe P'P'. The nut 51 is connected to an external screw thread 55 around the recess 53 and is adapted when tightened to compress the gasket within the recess 53 and form a permanent leakproof joint between the upper end of the tubular member 34 and the lower end of pipe P'P'. The coupling nipple 32 depends from the lower end of the member 34 and is provided at its lower end with a coupling ring 56 whereby it is connected to the upper threaded end of the outlet tube of the meter M'. The upper end of the nipple 32 is smooth and fits within the lower end of the tubular member 34. It is held in substantially centered relation within the lower end of the member 34 by an annular flange 57 and is locked and secured in place by means of a compressible annular gasket 58 and a ring nut 59. The gasket 58 has a smooth or cylindrical inner periphery in which the upper smooth end of the nipple 32 fits slidably. It is provided at its lower end with a retainer 60 and is disposed in an annular recess 61 which is defined at its upper end by the flange 57. The nut 59 is connected to an external screw thread 62 on the lower end of the tubular member 34 and is adapted when tightened to compress the washer 58 so that it fills the upper end of the recess and forms a permanent flexible leakproof joint between the upper end of the coupling nipple 32 and the lower end of the member 34.

The connecting device in Figure 2 is installed or assembled by first taking the coupling nipples 31 and 32 while they are in disconnected relation with respect to the crossbar and connecting them to the meter tubes. Thereafter the upper ends of the nipples are brought into seated relation with the lower ends of the tubular members at the ends of the crossbar and the ring nuts 44 and 59 are tightened so as to compress the compressible gaskets at the lower ends of the tubular members 33 and 34 and form the desired permanent leak-proof joints between the nipples and said tubular members. After connection of the nipples to the tubular members, the crossbar 30, together with the meter M', is raised and properly manipulated to bring the discharge end of the gas service pipe P' and the inlet end of the supply pipe P'P' into the upper ends of the tubular members. At the conclusion of this step the ring nuts 40 and 51 are tightened so as to compress the gaskets 38 and 50 and thus form the desired permanent leak-proof joints between the gas pipes and the upper ends of the tubular members 33, 34. If desired a cock (not shown) may be incorporated in the central portion of the tubular member 33 so as to control the flow of gas from the service pipe P' to the meter M'.

The meter connecting device of Figure 2 is characterized by the fact that the gasket forming joints dispense with the necessity of screw threads and materially facilitate installation or assembly of the device as a whole. It is also characterized by the fact that the upper ends of the offset coupling nipples may be inserted to whatever extent is necessary into the lower ends of the tubular members and thus any strain on the meter device is effectively avoided. By having gasket formed joints between the upper ends of the nipples and the tubular members as well as gasket formed joints between the upper ends of the tubular members and the pipes P' and P'P', there is sufficient flexibility as far as the device is concerned to absorb any pipe vibration and to prevent the same from being transmitted to the meter. By employing leak-proof joints of the compressible gasket type between the upper ends of the offset coupling nipples 31 and 32 and the lower ends of the tubular members 33 and 34 the meter may be connected to the crossbar without imposing any strain whatsoever on the tubes even though one of the nipples is longer than the other.

The connecting device of Figure 3 constitutes another and third embodiment of the invention. It is shown in connection with a gas meter M², a gas service pipe P² and a supply pipe P²P², and comprises a one-piece cast metal crossbar 63 and a pair of straight coupling nipples 64 and 65. The crossbar is adapted to extend horizontally and is provided at its ends with a pair of vertically extending tubular members 66 and 67. In general the device of Figure 3 is like that of Figure 2 except that the tubular members at the ends of the crossbar instead of being formed integrally with the bar are formed separately. The tubular member 66 serves as a connecting medium between the pipe P² and the coupling nipple 64. It is rotatably mounted in a cylindrical socket 68 in the crossbar and is secured against axial displacement and also rotation relatively to the socket by way of a set screw 69. The latter extends through the socket forming portion of the crossbar and fits within an annular groove 70 in the central portion of the tubular member 66. The upper end of the member 66 projects above the bar and is shaped to receive the discharge end of the service pipe P². A compressible gasket and ring nut type connection serves to form a permanent flexible leak-proof joint between the upper end of the member 66 and the pipe P². The lower end of the member 66 projects beneath the crossbar and is of reduced diameter. It is eccentrically disposed with respect to the socket and is shaped to receive the upper end of the coupling nipple 64. The upper end of the nipple is secured in connected relation with the lower end of the member 66 by way of a compressible annular gasket 71 and a ring nut 72. The latter are arranged similarly to and operate like the gasket 43 and the ring nut 44 of the Figure 2 meter connecting device. The coupling nipple is adapted to be adjusted transversely in order to bring the lower end thereof into alignment with the inlet tube in the meter M² by rotating the tubular member 66 in the socket 68.

The tubular member 67 serves as a connecting medium for the supply pipe P²P² and the coupling nipple 65 and is similar in design and construction to the tubular member 66. It is rotatably mounted in a vertical cylindrical open-ended socket 73 in the crossbar and is secured against axial displacement by way of a set screw 74. The lower end of the member 67 is shaped to receive the inlet end of the pipe P²P² and is connected to the latter by means of a compressible gasket and ring nut type connection which provides a permanent leak-proof joint. The lower end of the tubular member 67 is of reduced diameter and is eccentrically disposed with respect to the socket 73. It is shaped to receive the upper end of the coupling nipple 65 and is connected to the latter by means of a compressible gasket 75 and a ring nut 76. The latter correspond in design and function to the compressible gasket 58 and ring nut 59 of the Figure 2 meter connecting device. The lower end of the coupling nipple 65 is connected by a coupling ring to the threaded upper end of the outlet tube of the meter M².

The connecting device of Figure 3 is installed or assembled by first connecting the upper ends of the straight coupling nipples 64 and 65 to the lower ends of the tubular members 66 and 67. This is accomplished by inserting such ends into the lower ends of said members 66 and 67 and then tightening the nuts 72 and 76. After connection of the nipples and members the set screws 69 and 74 are released and the members are rotated until the lower ends of the nipples are properly spaced for application or connection to the meter tubes. After the tubular members have been rotated for proper spacing of the coupling nipples the set screws are tightened and the coupling rings at the lower ends of the nipples are screwed onto the threaded upper ends of the meter tubes. At the conclusion of this operation the crossbar 63 together with the meter is raised in order to bring the gas pipes into inserted relation with respect to the upper ends of the tubular members. Thereafter the ring nuts at the upper ends of the said members are tightened in order to provide the desired joints between the gas pipes and the tubular members.

The herein described forms or types of meter connecting devices may be manufactured at a comparatively low and reasonable cost and effectively and efficiently fulfill their intended purposes. They may be installed or assembled with facility and when in their operative position prevent any strain on the meter tubes as well as eliminate vibration.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A meter bar for supporting a gas meter or like delicate instrument and protecting it against strains and vibrations comprising a pair of ends having fluid passageways therein adapted to be connected in fluid-tight relation to a gas meter or like instrument, said passageways having portions adapted to receive service and house pipes therein, flexible gaskets for forming sealed fluid-tight connections between said passageways and said pipes, said flexible gaskets compensating for misalignment of said pipes and forming the only supporting connections between the meter bar and said pipes and protecting the meter or like instrument against damage as a result of vibrations in said pipes, means for holding said gaskets in sealing engagement with said pipes and said ends, and means connecting said ends.

2. A device designed for use in connecting the side tubes of a conventional gas meter to a pair of gas pipes and comprising a horizontal crossbar having means associated with one end thereof for connecting one of the meter tubes to one of the gas pipes, an open ended hollow member at the other end of the crossbar embodying means at one end thereof for connection to the other meter tube and having its other end shaped to surround the other gas pipe and provided with a screw thread, a compressible gasket associated with said other end of the member and adapted to have said other pipe slide freely into it without rotative movement, and a gasket-engaging ring nut connected to the screw thread and adapted when tightened to compress the gasket inwardly around said other pipe and form a flexible vibration absorbing leak-proof joint between said other pipe and said other end of the member.

3. A device designed for use in connecting the side tubes of a conventional gas meter to gas service and supply pipes having laterally spaced substantially parallel and vertical adjoining ends with smooth outer peripheries, and comprising a crossbar adapted to extend horizontally between the ends of the pipes, a pair of vertically extending tubular members at the ends of the crossbar embodying means at the lower ends thereof for connection to the meter tubes and having the upper ends thereof shaped to surround said ends of the pipes and provided with inwardly facing pipe encircling annular recesses and screw threads adjacent said recesses, a pair of inwardly compressible gaskets with smooth inner peripheries, fitting within the recesses respectively and adapted slidably to receive said ends of the pipes, and a pair of ring nuts connected to the screw threads and adapted when tightened to compress the gaskets inwardly around said pipe ends and form flexible vibration absorbing leak-proof joints between the pipes and the upper ends of the members.

4. A device designed for use in connecting the side tubes of a conventional gas meter to a pair of gas pipes and comprising a horizontal crossbar having means at one end thereof for connecting one of the meter tubes to one of the gas pipes, an open ended hollow member at the other end of the crossbar embodying means at one end thereof for connection to the other gas pipe and having the other end thereof facing downwards and provided with a screw thread, a vertically extending coupling nipple provided with means at the lower end thereof for connection to the other meter tube and having its upper end fitting within said other end of the member, an inwardly compressible nipple surrounding gasket associated with said other end of the member and adapted to have the upper end of the nipple slide freely into it without rotative movement, and a ring nut connected to the screw thread and serving when tightened to compress the gasket inwardly around said upper end of the nipple and form a flexible vibration absorbing leak-proof joint between the nipple and said other end of the member.

5. A device designed for use in connecting the side tubes of a conventional gas meter to a pair of gas pipes and comprising a horizontal crossbar, a pair of hollow members at the ends of the crossbar having open upper ends together with means for connecting such ends to the gas pipes respectively and having open lower ends provided with inwardly facing annular recesses and screw threads adjacent said recesses, a pair of vertically extending coupling nipples provided with means at the lower ends thereof for connection to the meter tubes and having their upper ends with smooth external peripheries and fitting within the lower ends of the members, a pair of inwardly compressible annular gaskets with smooth inner peripheries, fitting in the recesses and in sliding engagement with the upper ends of the nipples, and a pair of ring nuts connected to the screw threads and adapted when tightened to compress the gaskets inwardly around the upper ends of the nipples and form flexible vibration-absorbing leak-proof joints between the nipples and said lower ends of the hollow members.

6. A device designed for use in connecting the side tubes of a conventional gas meter to a pair of gas pipes and comprising a horizontal crossbar having means associated with one end thereof for connecting one of the meter tubes to one of the gas pipes, a hollow open ended member at the other end of the crossbar having one end thereof shaped to surround the other gas pipe and provided with a screw thread, and having the other end thereof facing downwards and provided with a screw thread, a compressible gasket with a smooth inner periphery, associated with said one end of the member and adapted slidably to receive said other gas pipe, a ring nut connected to the screw thread at said one end of the member and adapted when tightened to compress said gasket around said other pipe and form a flexible vibration-absorbing leak-proof joint between said other pipe and the member, a vertically extending coupling nipple provided with means at the lower end thereof for connection with the other meter tube and having its upper end with a smooth external periphery and fitting within said other end of the member, a compressible nipple surrounding gasket with a smooth inner periphery associated with said other end of the member and in sliding engagement with the upper end of the nipple, and a second ring nut connected with the screw thread at said other end of the member and adapted when tightened to compress the last mentioned gasket inwardly around said upper end of the nipple and form a flexible vibration-absorbing leak-proof joint between the nipple and said member.

KURT A. SCHARBAU.